United States Patent
Bronson et al.

(10) Patent No.: US 8,972,664 B2
(45) Date of Patent: *Mar. 3, 2015

(54) MULTILEVEL CACHE HIERARCHY FOR FINDING A CACHE LINE ON A REMOTE NODE

(71) Applicant: International Business Machines Corporation, Armonk, NY (US)

(72) Inventors: Timothy C. Bronson, Round Rock, TX (US); Garrett M. Drapala, Poughkeepsie, NY (US); Michael A. Blake, Wappingers Falls, NY (US); Craig R. Walters, Highland, NY (US); Pak-Kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,708

(22) Filed: Mar. 11, 2013

(65) Prior Publication Data

US 2013/0339609 A1 Dec. 19, 2013

Related U.S. Application Data

(63) Continuation of application No. 13/495,373, filed on Jun. 13, 2012.

(51) Int. Cl.
*G06F 12/06* (2006.01)
*G06F 12/08* (2006.01)
*G06F 12/12* (2006.01)

(52) U.S. Cl.
CPC .......... *G06F 12/0811* (2013.01); *G06F 12/123* (2013.01); *G06F 12/0817* (2013.01); *G06F 12/0884* (2013.01)

USPC ..... 711/124; 711/122; 711/136; 711/E12.014; 711/E12.027

(58) Field of Classification Search
CPC ............ G06F 12/0811; G06F 12/0817; G06F 12/084; G06F 12/12; G06F 12/121–12/125; G06F 2212/62; G06F 2212/621–2212/622
See application file for complete search history.

(56) References Cited

U.S. PATENT DOCUMENTS

| 5,394,555 A * | 2/1995 | Hunter et al. ................. 711/148 |
| 8,140,759 B2 | 3/2012 | Frey et al. |
| 2003/0131201 A1* | 7/2003 | Khare et al. .................. 711/144 |
| 2004/0193810 A1* | 9/2004 | Borkenhagen et al. ........ 711/146 |
| 2006/0036811 A1* | 2/2006 | Dieffenderfer et al. ....... 711/136 |
| 2007/0073979 A1* | 3/2007 | Tsien ............................. 711/146 |
| 2007/0079072 A1* | 4/2007 | Collier et al. ................. 711/133 |
| 2010/0100683 A1 | 4/2010 | Guthrie et al. |
| 2011/0302374 A1* | 12/2011 | Cantin et al. .................. 711/141 |

* cited by examiner

*Primary Examiner* — Michael Krofcheck
(74) *Attorney, Agent, or Firm* — Cantor Colburn LLP; Margaret McNamara

(57) ABSTRACT

Embodiments relate to accessing a cache line on a multi-level cache system having a system memory. Based on a request for exclusive ownership of a specific cache line at the local node, requests are concurrently sent to the system memory and remote nodes of the plurality of nodes for the specific cache line by the local node. The specific cache line is found in a specific remote node. The specific remote node is one of the remote nodes. The specific cache line is removed from the specific remote node for exclusive ownership by another node. Based on the specified node having the specified cache line in ghost state, any subsequent fetch request is initiated for the specific cache line from the specific node encounters the ghost state. When the ghost state is encountered, the subsequent fetch request is directed only to nodes of the plurality of nodes.

7 Claims, 6 Drawing Sheets

| IM | MC | EX | CHIPID(0:5) | DESCRIPTION |
|----|----|----|-------------|-------------|
| 0 | 0 | 0 | 000000 | INVALID |
| 0 | 0 | 0 | 100000 | INVALID - GHOST |
| 0 | 0 | 1 | 000000 | DELETED |
| 0 | 1 | 1 | 000000 | MOVE PAGE FETCH BUFFER SLOT |
| 0 | 1 | 0 | 000000 | IM=0 MC=1 RO UNOWNED |
| 0 | 1 | 0 | RRRRRR | IM=0 MC=1 RO L3 |
| 1 | 0 | 0 | 000000 | IM=1 MC=0 RO UNOWNED |
| 1 | 0 | 0 | RRRRRR | IM=1 MC=0 RO L3 |
| 1 | 0 | 1 | EEEEEE | IM=1 MC=0 EX L3 |
| 1 | 1 | 0 | 000000 | IM=1 MC=1 RO UNOWNED |
| 1 | 1 | 0 | RRRRRR | IM=1 MC=1 RO L3 |

FIG. 4

MULTILEVEL CACHE HIERARCHY FOR FINDING A CACHE LINE ON A REMOTE NODE

CROSS-REFERENCE TO RELATED APPLICATION

This application is a continuation of U.S. patent application Ser. No. 13/495,373 filed Jun. 13, 2012, the disclosure of which is incorporated by reference herein in its entirety.

BACKGROUND

The present invention relates generally to processing within a computing environment, and more specifically, to a computing system with a multilevel cache hierarchy.

A cache is generally a memory that stores copies of data from the most frequently used system memory locations such that future requests for data may be served faster. A multiprocessor computing system includes multiple processing units that are coupled to one another, and share a system memory. In order to reduce access latency to data and instructions residing in the system memory, each processing unit may be supplied with a multi-level cache hierarchy. For example, a level one (L1) cache may have a lower access latency than a level two (L2) cache, the L2 cache may have a lower access latency than a level three (L3) cache, and the L3 cache may have a lower access latency than a level four (L4) cache. Cache operations in a multilevel cache hierarchy are controlled by a cache controller. Within a cache, data are organized and tracked on a cache line basis, where a typical cache line contains a fixed number of bytes, for example, 256 bytes. Each level of cache has an associated directory to keep track of which lines of cache are stored in the specific cache.

In the event a cache miss occurs in a multiprocessor system, the cache controller initiates a fetch operation to acquire the requested cache line. A cache miss occurs when a particular line of data causes a search of the associated directory, and the requested line of cache is not present. In one approach to obtain the requested cache line, a fetch operation for the missing cache line may be simultaneously launched to other caches or nodes as well as to the system memory. The latency for a fetch to another cache is generally considerably less than a fetch to the system memory. Thus, launching fetches to both the system memory and other caches improves latency, but the launch will utilize both inter-nodal busses as well as system memory access busses.

In another approach to obtain the requested cache line, the cache controller may initiate a fetch request to only the other caches first, which reduces unnecessary usage of associated buffers and control logic needed for system memory fetches. However, the cache controller is unable to determine ahead of time if a fetch to the caches or nodes will be successful. Thus, the cache controller has to wait to determine if the fetch is successful before initiating a fetch operation to the system memory, which increases latency.

SUMMARY

Embodiment includes a method product for accessing a cache line on a multi-level cache system having a system memory. Embodiment relate to accessing a cache line on a multi-level cache system having a system memory. Based on a request for exclusive ownership of a specific cache line at the local node, requests are concurrently sent to the system memory and remote nodes of the plurality of nodes for the specific cache line by the local node. The specific cache line is found in a specific remote node. The specific remote node is one of the remote nodes. The specific cache line is removed from the specific remote node for exclusive ownership by another node. Based on the specified node having the specified cache line in ghost state, any subsequent fetch request initiated for the specific cache line from the specific node encounters the ghost state. When the ghost state is encountered, the subsequent fetch request is directed only to nodes of the plurality of nodes. The subsequent fetch is absent of a concurrent fetch request to system memory.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 4 depicts a cache directory state for a remote node having a ghost state in accordance with an embodiment;

DETAILED DESCRIPTION

An embodiment for accessing a cache line on a multilevel cache system is disclosed. In one exemplary embodiment, the multilevel cache system includes four levels of cache, where a level four (L4) cache is in communication with a system memory. The multilevel cache system establishes a ghost state in at least one remote node, which indicates that a specific cache line has previously been removed by a fetch operation on a local node which requires an exclusive copy of the line. After the ghost state is established, any subsequent fetch on one of the remote nodes that encounters the ghost state sends a fetch only to the remaining nodes, and not to system memory. Specifically, the subsequent fetch (e.g., the subsequent fetch may be an exclusive fetch or a read-only fetch) is only sent from a controller of one of the remote nodes to the remaining nodes in the multilevel cache system, and not the system memory. Launching the subsequent fetch to only the remaining nodes, and not the system memory will in turn improve latency of the multilevel cache system.

Figure 1:
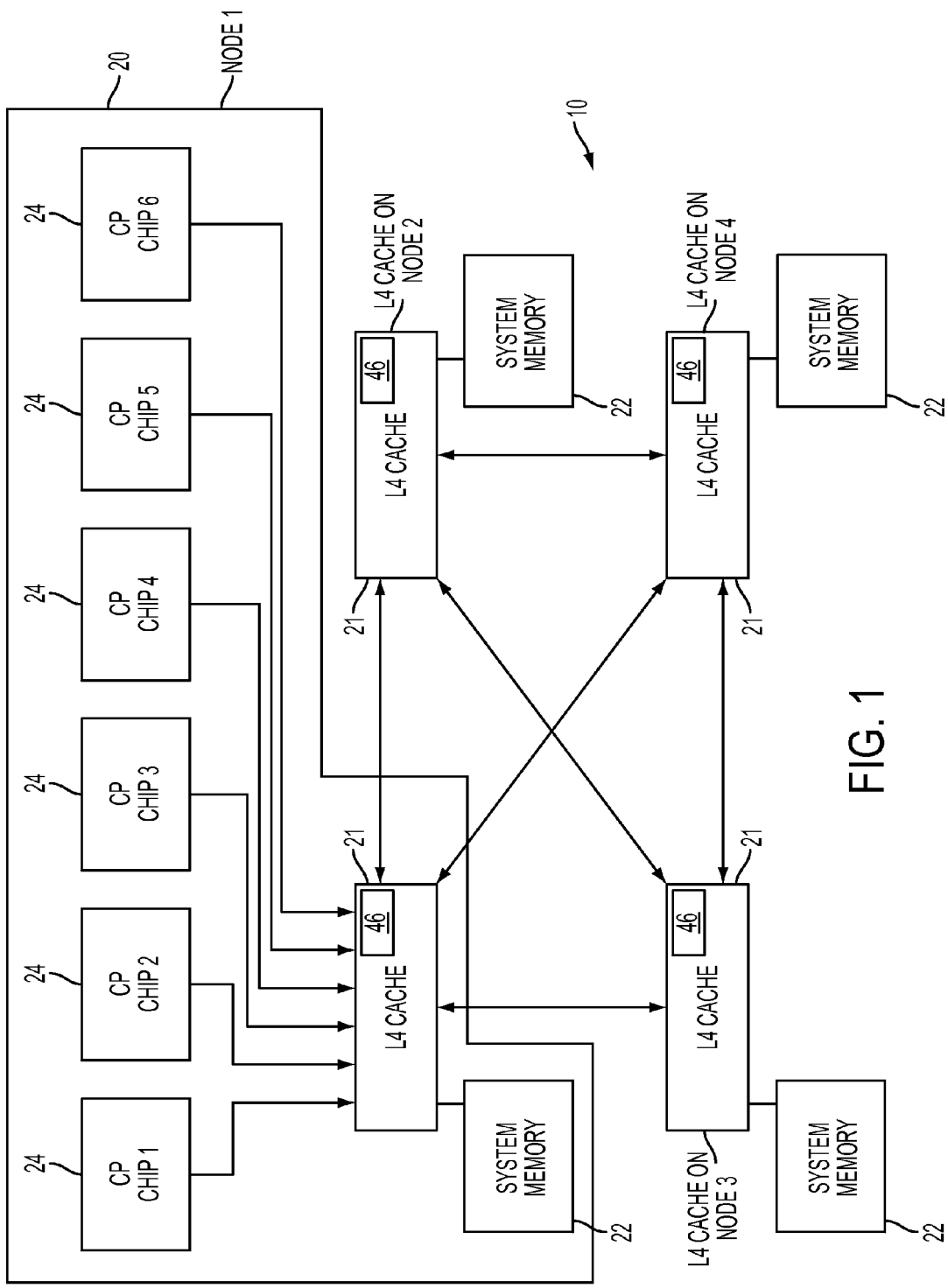
FIG. 1 depicts a multilevel cache in accordance with an embodiment.

FIG. 1 illustrates an example of a computing system 10 in accordance with one embodiment. The computing system 10 includes at least two nodes 20 that are each in communication with one another. Each node 20 includes a portion of system memory 22 which is in communication with the L4 cache 21 on that node 20. In the exemplary embodiment as shown in FIG. 1, the computing system 10 includes four nodes 20, however it is understood that any number of multiple nodes may be used as well. Specifically, FIG. 1 illustrates a Node 1, Node 2, Node 3, and Node 4. Each node is in communication with one or more central processing (CP) chips 24. For example, in one embodiment, each node 20 is in communication with six CP chips 24 (FIG. 1 illustrates only Node 1 in communication with six CP chips 24 for purposes of clarity).

Figure 2:
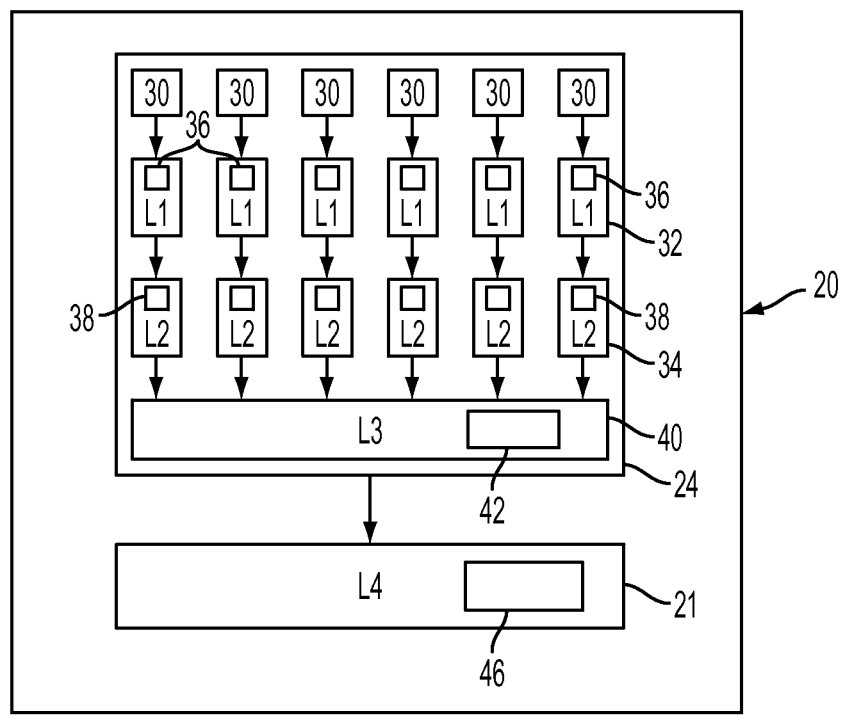
FIG. 2 depicts a central processing (CP) chip in accordance with an embodiment.

Referring now to FIGS. 1-2, each CP chip 24 includes one or more cores 30 for the reading and executing of instructions. For example, in the embodiment as shown in FIG. 2, each CP chip 24 includes six cores 30, however it is understood that any number of cores 30 may be used as well. Referring to FIG. 2, each core 30 is operatively coupled to a level one (L1) cache 32 and a level two (L2) cache 34. The L1 caches 32 are coupled to the cores 30, and the L2 caches 34 are coupled to the L1 caches 32. The L1 cache 32 includes an L1 controller 36, and the L2 cache 34 includes an L2 controller 38. Each L2 cache 34 is coupled to a level three (L3) cache 40, where one L3 cache 40 is included in each CP chip 24. Each L3 cache 40 is shared by multiple L2 caches 34. For example, in the embodiment as shown in FIG. 2, the L3 cache 40 is shared by six L2 caches 34. The L3 cache 40 also includes an L3 controller 42. The level four (L4) cache 21 is shared by one or more L3 caches 40. Each L4 cache 21 includes an L4 cache controller 46. In the embodiment as shown, the node 20 (e.g., Node 1, Node 2, Node 3 and Node 4, shown in FIG. 1) includes six L3 caches 40 which are in communication with the L4 cache 21 on the node.

In one embodiment, the L1 caches 32 are 1 MB, the L2 caches 34 are 1 MB, the L3 caches 40 are 48 MB, and the L4 caches are 384 MB. However, it is to be understood that other sizes may be used as well. It is also understood that although FIGS. 1-2 illustrate a multi-level cache hierarchy having four levels of cache, it is understood that the computing system 10 may include any number of levels of cache. It is also understood that while FIGS. 1-2 illustrate the highest level cache on nodes 20 as L4 caches, the highest level cache on nodes 20 may be a lower level of cache (e.g., a L3 cache) or a higher level of cache as well.

When one of the cores 30 located on a specific node 20 (e.g., Node 1, Node 2, Node 3, and Node 4) request data for a potential update, the cache located in the specific node 20 (e.g., the L1 cache 32, the L2 cache 34, the L3 cache 40 and the L4 cache 21) receive a request for information. Specifically, with reference to FIG. 1, in one illustrative embodiment one of the cores 30 (shown in FIG. 2) of the CP chip 1 of Node 1 may request data for a potential update. If the data requested is contained in any of the L1 cache 32, the L2 cache 34, the L3 cache 40, and the L4 cache 21 of Node 1 20 (which is referred to as a cache hit), the request may be served. However, in the event the data that was requested is not contained in any of the L1 cache 32, the L2 cache 34 the L3 cache 40, and the L4 cache or node 20 of Node 1, this is referred to as a cache miss.

Figure 3:
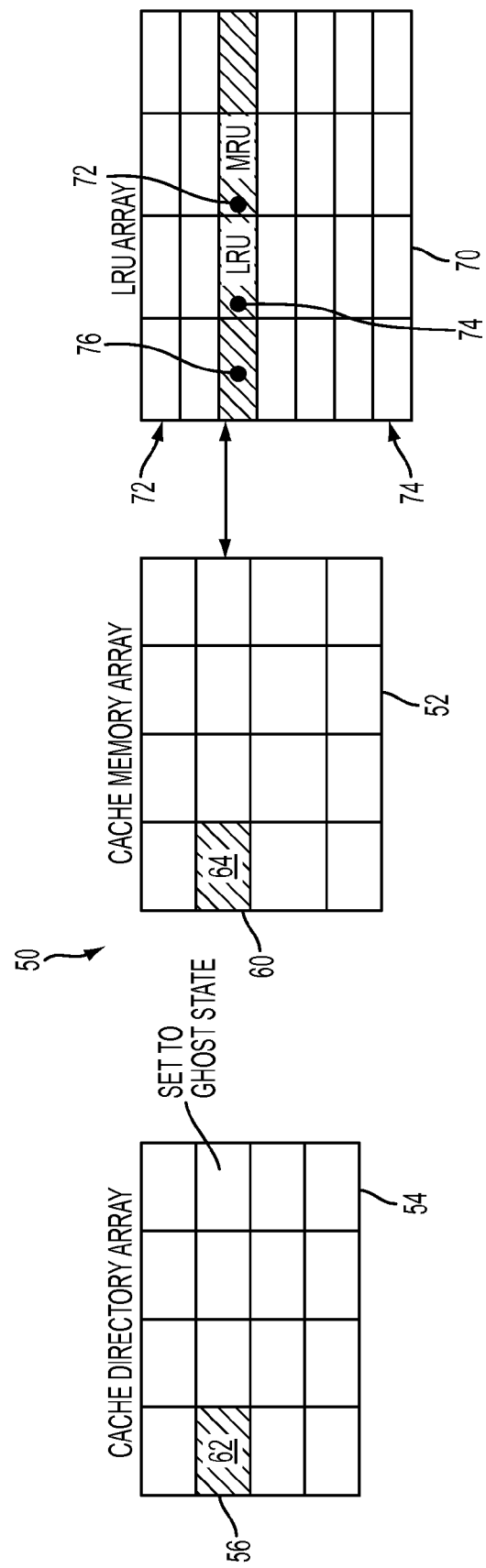
FIG. 3 depicts a cache memory system in accordance with an embodiment.

In the event a cache miss occurs, an exclusive fetch for the missing data is sent to the remaining or remote nodes 20 (e.g., Node 2, Node 3, and Node 4) as well as the system memory 22. FIG. 3 is an illustration of a cache memory system 50 for the L4 cache 21. The cache memory system 50 includes a cache memory array 52 and a corresponding cache directory array 54. The cache directory array 54 includes a plurality of directory entries 56 that correspond to one of a plurality of cache lines 60 of the cache memory array 52. For example, in the embodiment as shown in FIG. 3, a specific directory entry 62 (shown in shading) corresponds to a specific cache line 64 (shown in shading). Thus, in the event a cache miss occurs, an exclusive fetch is sent to the remaining or remote nodes 20 to obtain the specific cache line 64 and to invalidate any copies of the line that may exist in the L4 caches 21 (and all lower level caches) on those remote nodes 20.

Referring now to FIGS. 1-3, in one illustrative embodiment one of the cores 30 of Node 1 (which is also referred to as a local node) requests the specific cache line 64. The L1 cache 32, the L2 cache 34, the L3 cache 40 and Node 1 receive a request for the specific cache line 64. However, in the event that the specific cache line 64 is not found and a cache miss occurs, then the L4 cache controller 46 initiates an exclusive fetch to each of Node 2, Node 3, and Node 4, (which are referred to as remote nodes) on behalf of the requesting core 30.

In the event one of the remote nodes (e.g., Node 2) contain the specific cache line 64, the specific cache line 64 is sent back or fetched by the local node (e.g., Node 1) and saved in the local node. Once the specific cache line 64 is removed from one of the remote nodes having the specific cache line 64 (e.g., Node 2), then a ghost state is set in the specific directory entry 62 (shown in shading in FIG. 3) corresponding to the fetched line (the specific cache line 64). The ghost state is also set in any remaining remote node (e.g., Node 3, or Node 4) containing a copy of the specific cache line 64. The ghost state indicates that the specific cache line 64 has been invalidated, and was previously been removed or fetched by the local node (e.g., Node 1).

In one embodiment, the local node (e.g., Node 1) may already have a copy of the specific cache line 64 at the beginning of the exclusive fetch operation. In this case, there is no node-to-node data movement (e.g., the specific cache line 64 is not fetched by the local node). Instead, the specific cache line 64 is invalidated in each of the remote nodes having the specific cache line 64, and the ghost state is set.

FIG. 4 is an exemplary illustration of a cache directory state table illustrating eleven ownership tags for a remote node that has the ghost state set. For each cache line in the remote node there is a corresponding ownership tag. "IM" is the intervention master, and applies to only one copy if the data is held in multiple caches. The IM identifies which one of the multiple copies will respond to a request by another cache for a copy of data. "MC" designates multiple copies, and designates that multiple copies of the data may exist in different caches. This is possible only if the data is read only (as opposed to an exclusive state). "EX" is an exclusive bit and means that the data is held in an exclusive state by a core 30 (shown in FIG. 2). "CHIPID" is a six-bit value that corresponds to the six CP chips 24 shown in FIG. 1, and illustrates which one of the CP chips 24 has a core 30 that may include a copy of the specific cache line 64.

The cache directory state illustrates the second ownership tag encoding as the ghost state (under "Description", it reads "Invalid—Ghost"). FIG. 4 is an exemplary illustration of an approach to identify or decode the ghost state in the cache directory by the ownership tag. Specifically, in the example as shown, the ghost state is identified by the IM, the MC, and the EX all being set to the value zero, and the CHIPID has a bit set (e.g., 100000) to indicate the ghost state.

After the specific cache line 64 has been fetched by the local node, and the ghost state is set in the cache directory array 54 of any of the remote nodes containing the specific cache line 64, a subsequent fetch may be sent by the controller 46 of any of the remote nodes (e.g., Node 2, Node 3, and Node 4) that has the ghost state set. Specifically, the subsequent fetch (e.g., the subsequent fetch may be an exclusive fetch or a read-only fetch) is only to the remaining nodes 20 in the computing system 10, and not the system memory 22. In other words, if the ghost state is set in the cache directory array 54, the controller 46 of the L4 cache 21 only sends a subsequent fetch to the other nodes 20 in the computing system 10.

Referring back to FIG. 3, the cache memory system 50 also includes a least recently used (LRU) array 70, which is examined on by a row (e.g., congruence class) basis. Each entry in a row corresponds to a directory entry in the same congruence class, and the entries within a row contain age information are so that the relative age of each entry can be tracked, from the youngest or most recently used (MRU) entry 72 to the oldest or LRU entry 74. In the embodiment as shown in FIG. 3, an entry 76 that is shaded corresponds to the specific cache line 64 (e.g., the line set to the ghost state) in the cache memory array 52. The entry 76 located in the LRU array 70 allows the tenure of the ghost state in the cache memory array 52 to be controllable. In other words, the LRU array 70 has the ability to update the age of each entry in a row of the LRU array at various increments between MRU, entry 72 and LRU entry 74 when creating ghost state entries, thus providing the ability to control how long the ghost state persists on a remote node (e.g., Node 2) from which the specific cache line 64 was taken.

Figure 5:
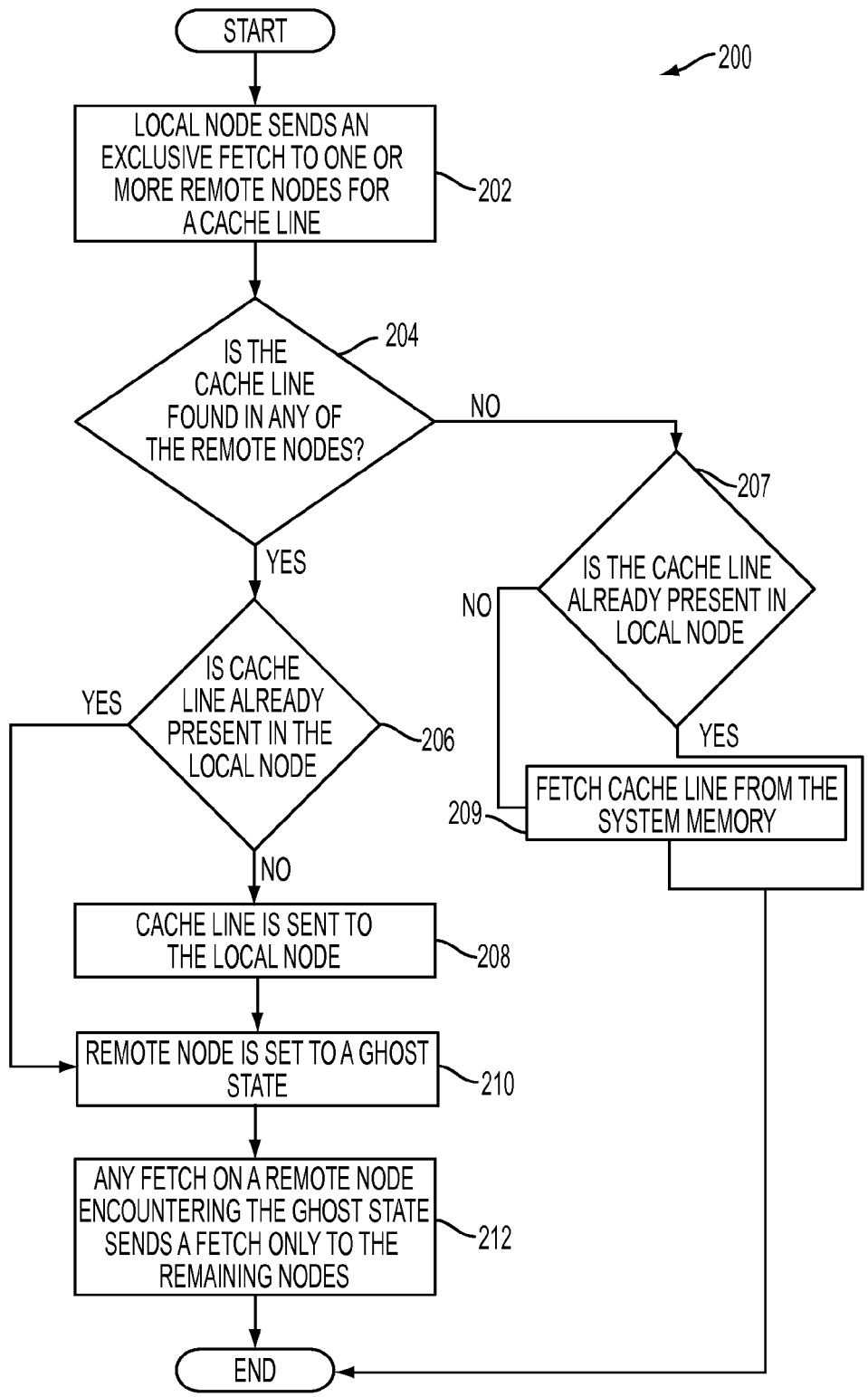
FIG. 5 depicts a process flow for establishing the ghost state in the remote node in accordance with an embodiment.

FIG. 5 is a process flow diagram illustrating a method 200 of operating the computing system 10 to establish the ghost state will now be discussed. Referring to FIGS. 1-5, method 200 begins at block 202, where the local node 20 (e.g., Node 1) sends an exclusive fetch to the remote nodes (e.g., Node 2, Node 3, and Node 4) for the specific cache line 64. Method 200 may then proceed to block 204.

In block 204, if the specific cache line 64 is not present in the remote nodes method 200 may then proceed to block 207. In block 207, if the specific cache line 64 is already present in the local node 20 (e.g., Node 1), method 200 may then terminate. If the specific cache line 64 is not present in the local node 20, then method 200 may proceed to block 209. In block 209, the specific cache line 64 is fetched from the system memory 22. Method 200 may then terminate.

Referring back to block 204, if the specific cache line is present in one of the remote nodes 20, method 200 may then proceed to block 206. In block 206, if the specific cache line 64 is present in the local node 20 (e.g., Node 1), method 200 proceeds to block 210. If the specific cache line 64 is not present in the local node 20, then method proceeds to block 208.

In block 208, the specific cache line 64 contained in the remote node (e.g., Node 2) is sent back to the local node (e.g., Node 1). Method 200 may then proceed to block 210.

In block 210, the ghost state is set in the specific directory entry 62 of any remote node 20 containing the specific cache line 64. The ghost state is shown in shading in FIG. 3, and corresponds to the line (e.g., the specific cache line 64) that was previously fetched by the local node. Method 200 may then proceed to block 212.

In block 212, any subsequent fetch initiated at one of the remote nodes that encounters the ghost state (e.g., Node 2) sends a subsequent fetch to the remaining nodes 20 (e.g., Node 1, Node 3, and Node 4) to obtain the specific cache line 64. Specifically, the subsequent fetch which encounters the ghost state (e.g., the subsequent fetch may be an exclusive fetch or a read-only fetch) is only sent from the controller 46 of any of the remote nodes having the ghost state to the other nodes 20 in the computing system 10, and not the system memory 22. Method 200 may then terminate.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
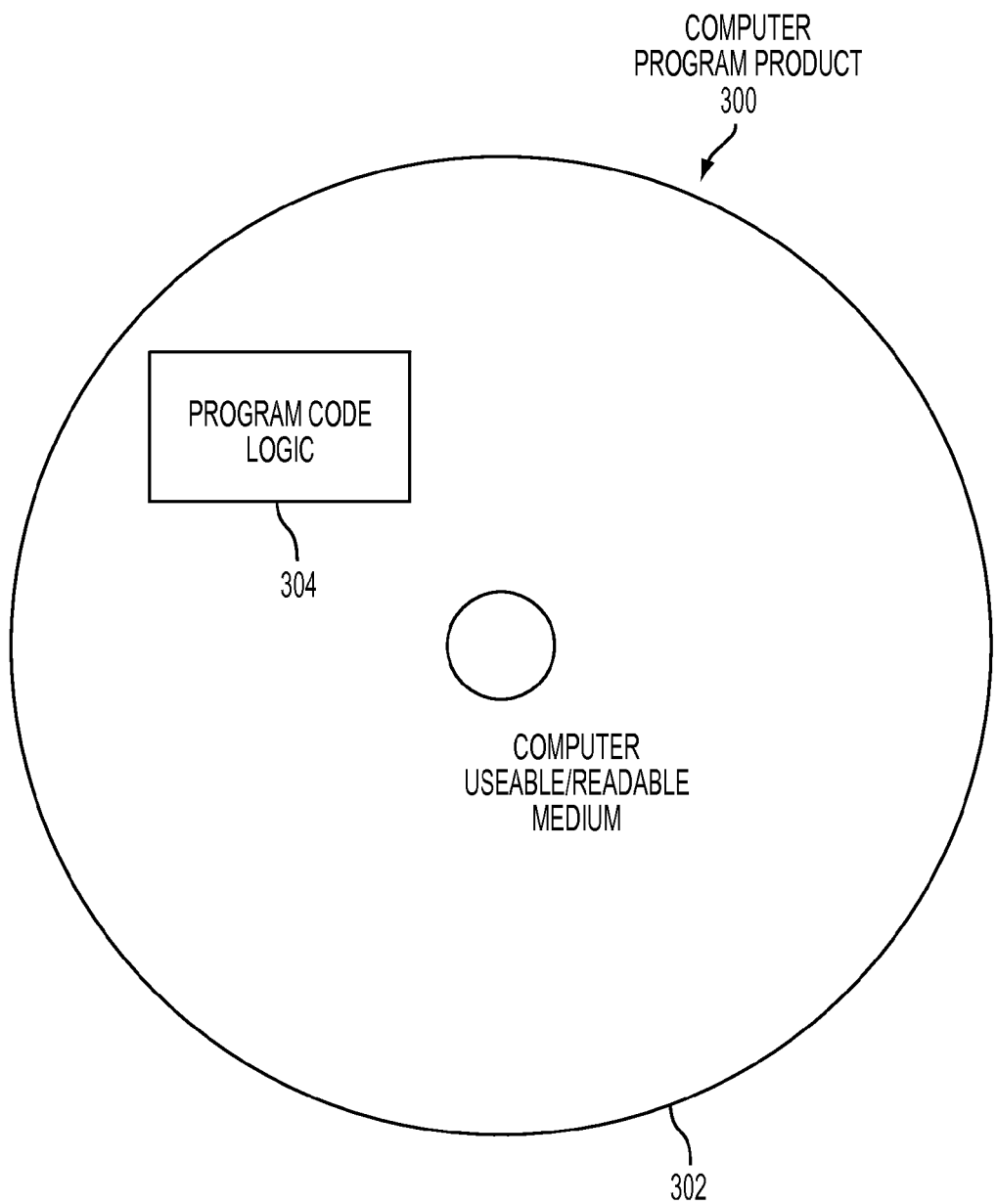
FIG. 6 illustrates a computer program product in accordance with an embodiment.

Referring now to FIG. 6, in one example, a computer program product 300 includes, for instance, one or more storage media 302, wherein the media may be tangible and/or non-transitory, to store computer readable program code means or logic 304 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include the computer system 10 having significantly more data available to the nodes 20 when fetching data if a cache miss is experienced, with relatively low expense and resources. The computer system 10 as described above may be especially effective for fetching specific cache lines for exclusive use. The computer system 10 also results in reduced traffic to the system memory 22, as well as reducing unnecessary usage of associated buffers and control logic for a fetch to the system memory 22.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for accessing a cache line on a multi-level cache system having a plurality of nodes comprising a local node and a plurality of remote nodes, the method comprising:

based on a request for exclusive ownership of a specific cache line at the local node, concurrently sending requests to the system memory and the plurality of remote nodes for the specific cache line by the local node;

finding the specific cache line in a specific cache of a specific remote node, the specific remote node being one of the plurality of nodes;

sending the specific cache line from the specific remote node to the local node;

saving the specific cache line in a local cache of the local node;

setting a directory state of the specific cache line to a ghost state in a respective cache directory in any cache of the plurality of remote nodes having the specific cache line, the ghost state indicating that the specific cache line has previously been removed for exclusive ownership by the local node, wherein a set of available directory states for a cache directory includes an invalid state and the ghost state, wherein the ghost state is distinct from the invalid state, and wherein the ghost state includes an identifier of the local node;

based on any remote node having the specific cache line in the ghost state, the ghost state indicating exclusive ownership of the specific cache line by the local node, for any subsequent fetch request for the specific cache line from any remote node, the subsequent fetch request is directed only to other nodes of the plurality of nodes without a concurrent fetch request to system memory for the specific cache line.

2. The method as claimed in claim 1 wherein the plurality of nodes are level four (L4) caches.

3. The method as claimed in claim 1 wherein the subsequent fetch is one of a read only fetch and an exclusive fetch.

4. The method as claimed in claim 1 wherein the exclusive fetch sent from the local node is responsive to a cache miss on the local node.

5. The method as claimed in claim 1 wherein the specific cache line corresponds to a specific row located in a least recently used (LRU) array, wherein a plurality of rows in the LRU array are tracked by age from most a recently used (MRU) row to a LRU row.

6. The method as claimed in claim 1 wherein the plurality of nodes are part of the multilevel cache hierarchy.

7. The method as claimed in claim 1 wherein the plurality of nodes are connected to one another and the system memory.

* * * * *